INVENTOR.
SAMUEL NISSIM

INVENTOR.
SAMUEL NISSIM

INVENTOR.
SAMUEL NISSIM

INVENTOR.
SAMUEL NISSIM

United States Patent Office 3,447,037
Patented May 27, 1969

3,447,037
DIGITAL DATA EQUIPMENT PACKAGING ORGANIZATION

Samuel Nissim, Malibu, Calif., assignor to The Bunker-Ramo Corporation, Stamford, Conn., a corporation of Delaware Filed July 25, 1966, Ser. No. 567,568
Int. Cl. H04q *1/02*
U.S. Cl. 317—101 9 Claims

ABSTRACT OF THE DISCLOSURE

A packaging organization for a digital data processing system. The packaging organization is characterized by utilizing a plurality of physical packages, e.g., a circuit board, each carrying essentially all of the hardware associated with a single bit. Such an organization permits a plurality of identical packages to be interconnected to form a system capable of processing, in parallel, words of a bit length equal to the number of packages employed.

This invention relates generally to digital data equipment and more particularly to improved packaging organizations therefor.

In the design of digital computers and other digital data equipment, attempts are consistently made to minimize the number of different physical packages required to fabricate the equipment; that is, regardless of the technology employed, be it printed circuit board modules employing discrete components, integrated circuit chips, or some other form of construction, a reduction in the number of different physical packages required usually reduces costs and improves reliability.

Conventionally, digital apparatus or equipment is packaged such that components of the same electronic device, e.g., a register, form part of the same physical package, e.g., a printed circuit board. Therefore, according to this conventional approach, it is necessary to have as many different physical packages as there are different electronic devices required to in turn perform the distinct functions ascribed thereto in respect of data input to and processed by the apparatus. In contrast to this conventional approach, the present invention is based on the recognition that, inasmuch as most pieces of digital equipment operate identically on or perform the same function in respect to each of a plurality of bits, the hardware associated with each bit can be contained in a single physical package and the number of such identical packages then required to fabricate the equipment would be equal to the number of bits which are operated on simultaneously. In other words, in order to process N bit words (i.e. digital words comprising N bit positions), N substantially identical physical packages would be required. As a consequence, more reliable digital data equipment can be provided at a lower cost when constructed in accordance with the present invention.

In addition to the foregoing, packaging of hardware components based on the bit with which each component is associated, rather than the electronic device of which each component forms a part, permits the use of identical packages to construct equipments employing different word lengths. Thus, the only essential difference between a ten bit word length piece of equipment and a fourteen bit word length piece of equipment, in accordance with the present invention, can be the number of physical packages or building blocks employed.

In accordance with a further feature of the present invention, the physical packages, e.g., circuit boards, are mounted like pages in a bound book. As a consequence of this type of mounting, the packages can be more densely distributed without sacrificing ease of access.

The embodiment of the invention specifically disclosed herein comprises a digital computer. However, it should be understood that the teachings of the invention are equally applicable to all other types of digital equipment. Moreover, it should be appreciated that the bit packaging approach disclosed herein is applicable to many different technologies. Thus, discrete or integrated electronic component packages can be used. Likewise, magnetic, fluid, cryogenic, and other types of hardware systems can be employed consistent with the teachings of the present invention.

The novel features that are considered characteristic of this invention are set forth with particularity in the appended claims. The invention will best be understood from the following description when read in connection with the accompanying drawings, in which:

Figure 1:
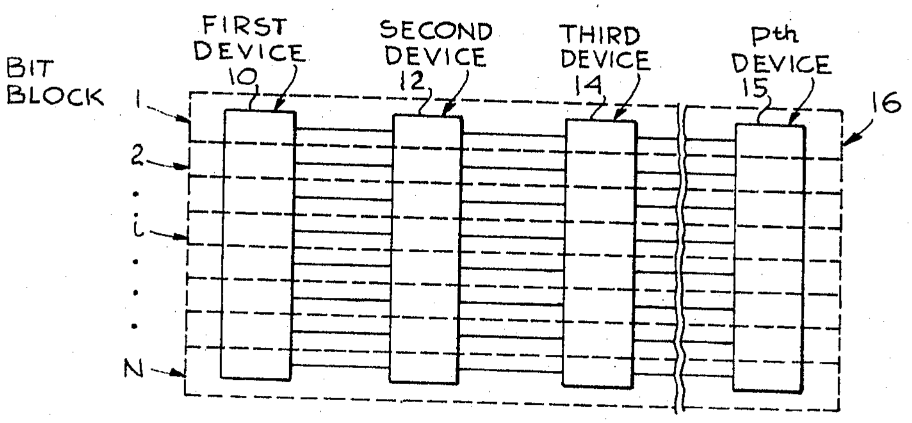
FIGURE 1 is a block diagram schematically illustrating a digital system packaged in accordance with the present invention.

Attention is now called to the figures and initially to FIG. 1 which illustrates a portion of a typical piece of digital data equipment. The apparatus of FIG. 1 can, for example, comprise a portion of a digital computer, a digital telemetry system, a digital control system, a display system, or any of several other known types of equipment. Regardless of the type of digital equipment, it will include P digital devices 10, 12, 14, and 15 which can, for example, comprise data registers, logic circuits, arithmetic units, etc. Each of the P devices shown in FIG. 1 includes a group of N stages and is thus capable of handling N binary digits or bits in parallel. As illustrated in solid line in FIG. 1, N output lines from the device 10 are connected to N input lines of the device 12. Similarly, N output lines of the devices 12 and 14 are respectively connected to N input lines of the devices 14 and 15. Hence, the apparatus can be thought of as being made up, at least in part, of P groups of N substantially identical bit stages. It should, of course, be understood that the values N and P can, in accordance with the present invention, comprise any convenient numbers.

Conventionally, the equipment illustrated in FIG. 1 would be packaged such that the N bit stages of the first device 10 are carried by a first one of P physical packages with the stages of the second and third devices 12 and 14 respectively carried by second and third ones of the P physical packages. Such physical packages can comprise printed circuit boards, for example, which carry discrete components forming the bit stages. Depending upon the circuit complexity of the stages, the size of the componentry utilized, and the size of the circuit boards, it may be feasible to carry each of the devices 10, 12, 14 and 15 on a single separate board. Utilizing other technologies, as for example, the monolithic integrated integrated circuit technology, it may be feasible to form the device 10 in a single integrated circuit package. In any event, regardless of the technology employed, digital data equipment has always been constructed so that the componentry of each physical package is related primarily to a specific circuit function to form a device as device 10 comprising a data register.

The packaging organization in accordance with the present invention is illustrated by the dotted lines in FIG. 1. Thus, N substantially identical building blocks each associated with a different bit are provided. More particularly, N bit blocks 16 are provided, each comprising a physical package which carries all of the componentry associated with a particular bit. Thus, each physical bit block package 16 would include a stage from each of the devices 10, 12, 14 and 15. Accordingly, as a consequence of packing the equipment of FIG. 1 in this manner, in lieu of having P different physical packages corresponding to the devices 10, 12, 14 and 15, the equipment of FIG. 1 can be constructed of N essentially identical packages 16. Although the advantages of the bit packaging approach disclosed herein are most noticeable when each physical package is confined to a single bit, it should be appreciated that in certain situations, it may be more desirable that each package contain a greater number of bits; e.g., two or three. Thus, one package can, for example, contain X sets of P stages and another package can contain Y sets of P stages where $X+Y=N$.

Figure 2:
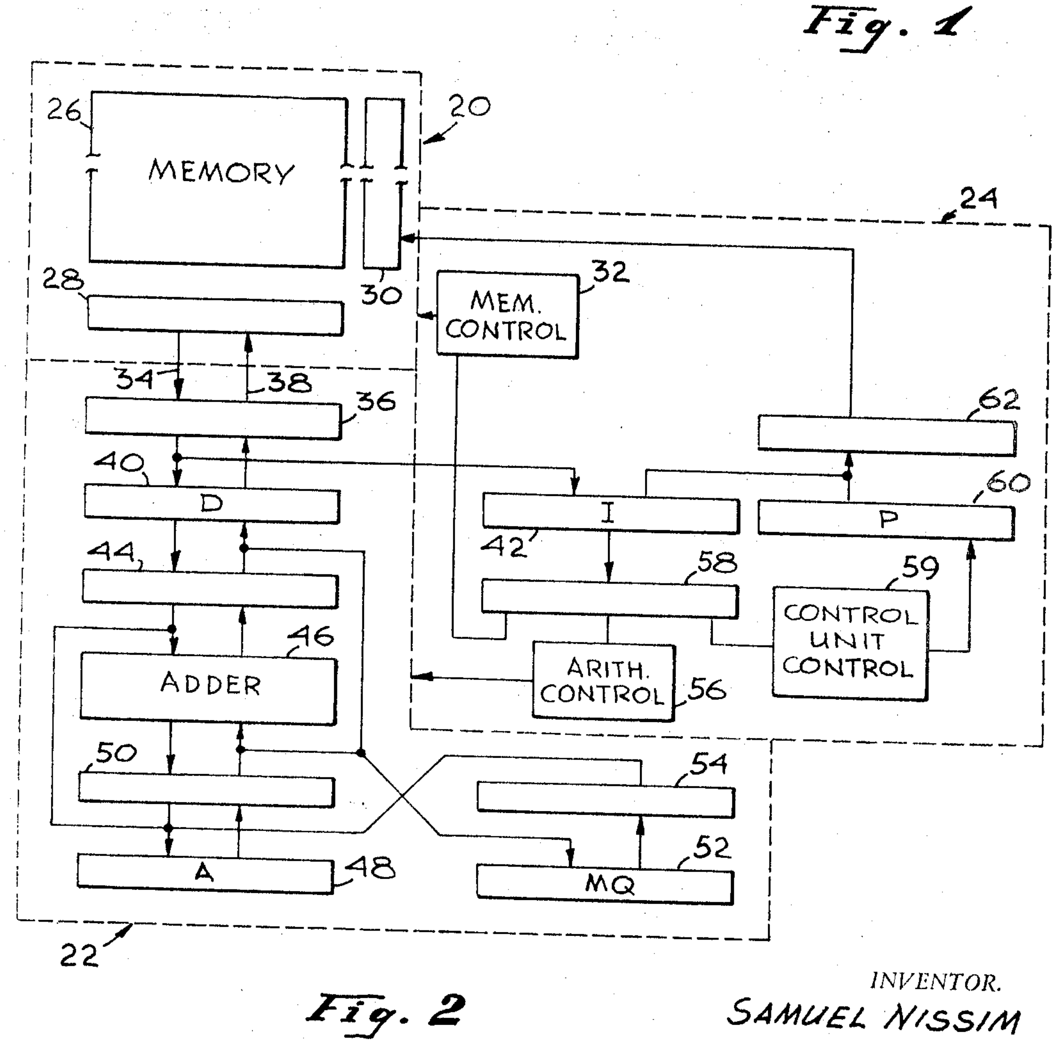
FIG. 2 is a block diagram of a conventional digital computer organization.

In order to more specifically illustrate the concept of the present invention, attention is called to FIG. 2 which illustrates a logic block diagram of a digital computer whose logic organization is substantially conventional. The digital computer of FIG. 2 includes a memory unit 20, an arithmetic unit 22, and a control unit 24. For the sake of simplicity, input/output equipment will not be considered.

The memory unit 20 includes a memory array 26, a memory data register 28, and an address register 30. In response to a digital address stored in the memory 30, and dependent upon whether a memory control means 32 defines a read or write operation, information will either be read from the memory and stored in memory data register 28 or information will be read from the memory data register 28 and stored in the memory.

The output terminal 34 of the memory data register is connected to the input of a logic circuit 36. The output 38 of logic circuit 36 is in turn connected to provide information to the input of memory data register 28. The logic circuit 36 can distribute the information received from the memory data register 28 to a data or D register 40 or an instruction or I register 42. A logic circuit 44 controls information transfer between the D register 40 and the adder circuit 46, and between the D register and the accumulator or A register 48. The logic circuit 44 is also illustrated as controlling information transfers from the adder circuit 46 to the D register 40. Similarly, a logic circuit 50 controls information transfers between the accumulator register 48 and adder circuit 46, and between the accumulator register 48 and the D register 40. The logic circuit 50 also couples the output of the accumulator register 48 to the input of a multiplier quotient (MQ) register 52. The output of the MQ register is coupled through logic circuitry 54 to the accumulator register 48 and the adder circuit 46.

The various information transfers occurring within the arithmetic unit 22 are controlled by an arithmetic control means 56. Both the arithmetic control means 56 and the memory control means 32 previously mentioned, function in response to instruction or command information stored in the instruction register 42. Logic circuitry 58 controls the application of information from the I register 42 to the memory and arithmetic control means as well as to control unit control means 59. The control means 59 controls a program sequence for P counter 60. The output of both the I register 42 and the P counter 60 can be provided to the memory address register 30 through a logic circuit 62.

It should be recognized by those skilled in the art that the block diagram of FIG. 2 represents a substantially conventional logical organization of a digital computer. Inasmuch as the specific logical organization of any digital data equipment is not germane to the present invention, the specific operation of the computer of FIG. 2 will not be discussed herein. It is presented, however, for the purpose of illustrating that a multitude of information transfers are required between various devices, such as registers, in the computer, which transfers are controlled by logic circuits such as logic circuit 36 or 62.

It should be recognized that although single lines have been illustrated in FIG. 2 to represent information transfers between devices, such as between the D register 40 and adder circuit 46, each single line will, in fact, consist of a number of lines equal to the number of bits being transferred in parallel. Accordingly, if an eight bit computer is assumed, then the output terminal 34 coupling the memory data register 28 to the logic circuit 36 would, of course, need to comprise eight different bit lines in order to handle the parallel or simultaneous transfer of eight information bits.

In accordance with the present invention, a piece of digital data equipment such as the computer of FIG. 2, is packaged so that the circuitry associated with each particular bit *i* forms part part of the same physical package. Preferably, but not necessarily, the circuitry associated with each particular bit is contained in a different physical package. More particularly, attention is now called to the logic block diagram of FIG. 3 which illustrates the logic circuitry associated with bit *i* isolated from the circuitry associated with each of the other bits.

Figure 3:
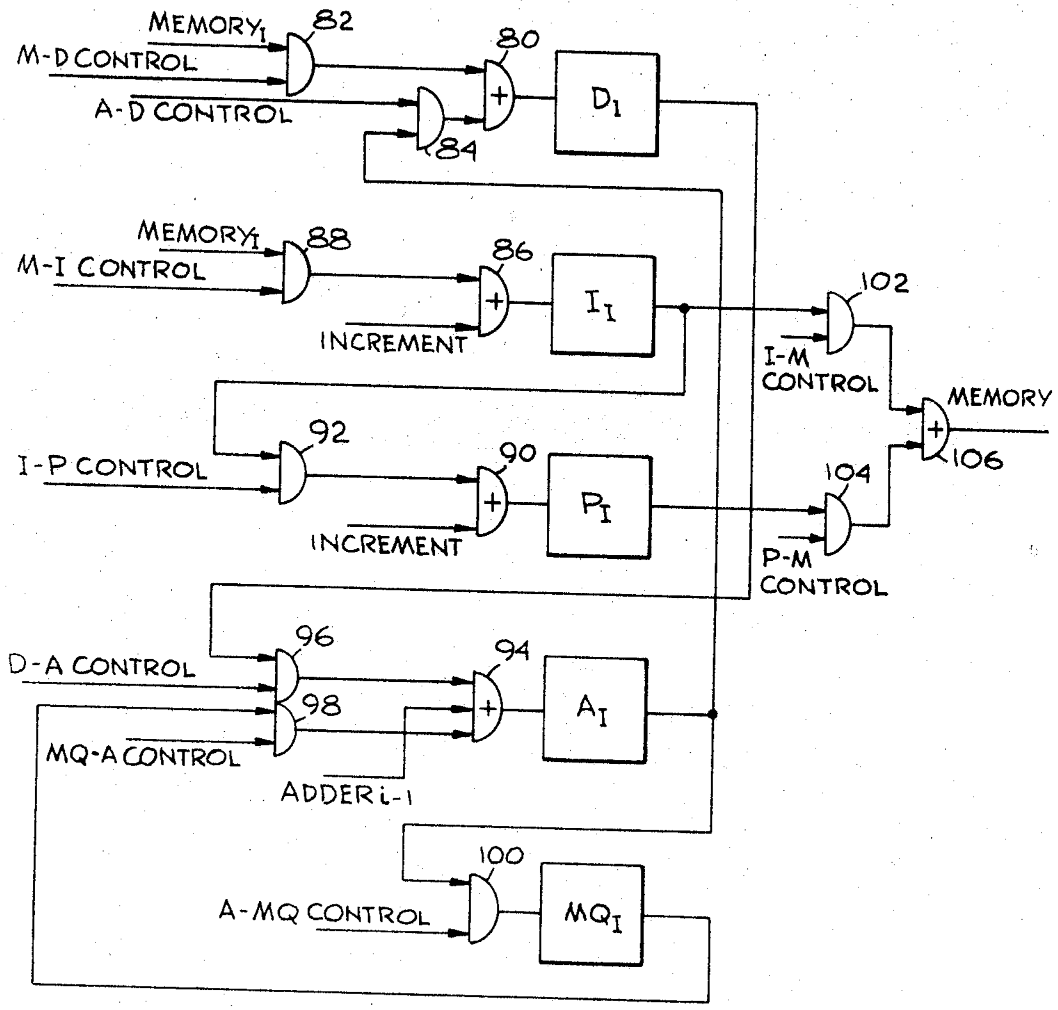
FIG. 3 is a logic block diagram essentially illustrating the componentry associated with a particular bit position in the digital computer of FIG. 2.

More particularly, note that the circuitry of FIG. 3 includes one stage *i* from each of the registers. Thus, storage stages $D_i$, $I_i$, $P_i$, $A_i$, and $MQ_i$ are provided. Each of these stages has an input terminal along its left side and an output terminal extending from its right side. An OR gate 80 is connected to the input side of stage $D_i$. The output of an AND gate 82 is connected to the input of OR gate 80. A first input to AND gate 82 is derived from stage *i* of the memory data register 28. AND gate 82 is enabled in order to execute a memory-D register transfer controlled by an M–D control signal. The output of AND gate 84 is also connected to the input of OR gate 80. A first input to the AND gate 84 is derived from the output of stage $A_i$. AND gate 84 is enabled by an accumulator-D register transfer commanded by an A–D control signal.

The output of OR gate 86 is connected to the input of stage $I_i$. A first input to OR gate 86 is connected to a source (e.g., control means 59) of increment control signals which acts to increment the I register. The second input to OR gate 86 is derived from the output of AND gate 88 which is enabled in response to an M–*i* control signal. The second input to AND gate 88 is derived from the I stage of memory data register 28. Thus, in response to the M–*i* control signal, the content of stage *i* of register 28 is entered into stage $I_i$.

The output of OR gate 90 is connected to the input of stage $P_i$. A first input to OR gate 90 comprises an increment control terminal derived from control means 59. The second input to OR gate 90 comprises the output of AND gate 92. The output of stage $I_i$ is connected to the input of AND gate 92 which is enabled in response to an I–P transfer control signal.

The output of OR gate 94 is connected to the input of stage $A_i$. Adder circuit stage ***i*–1 is connected to the input of OR gate 94. In addition, the outputs of AND gates 96 and 98 are connected to the input of OR gate 94. One input to gate 96 is derived from the output of stage $D_i$. AND gate 96 is enabled in response to a D–A transfer control signal. The information input to AND gate 98 is derived from the output of stage $MQ_i$. AND gate 98** is enabled in response to an MQ–A transfer control signal.

The output of AND gate 100 is connected to the input of stage $MQ_1$. The information input terminal of AND gate 100 is derived from the output of stage $A_1$. AND gate 100 is enabled in response to an A–MQ transfer control signal.

As noted in the block diagram of FIG. 2, information can be written into the memory address register 30 from either the I or P registers. In order to implement this, AND gates 102 and 104 are provided whose outputs are connected to the input of OR gate 106 which is connected to memory address register 30. The outputs of stages $I_1$ and $P_1$ respectively, are connected to the inputs of AND gates 102 and 104. AND gate 102 is enabled in response to an I–M transfer control signal and AND gate 104 is enabled in response to a P–M transfer control signal.

Figure 4:
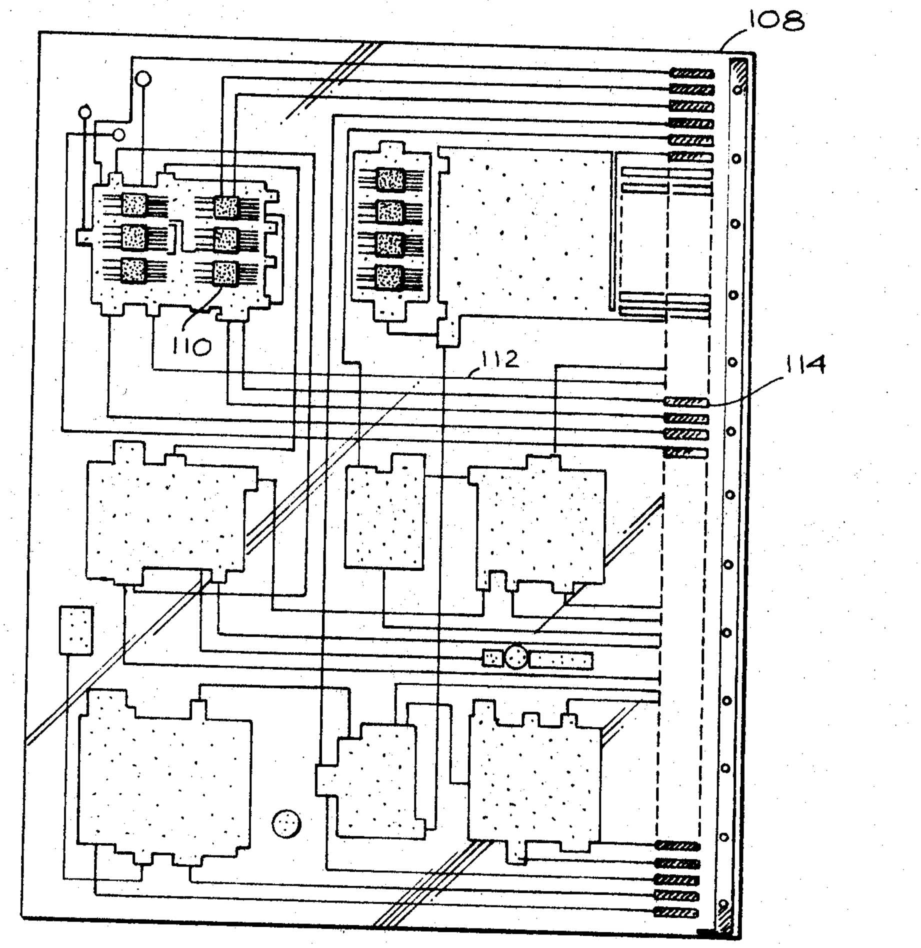
FIG. 4 is a simplified illustration of a printed circuit board carrying the hardware of FIG. 3 all associated with a single bit.
Figure 5:
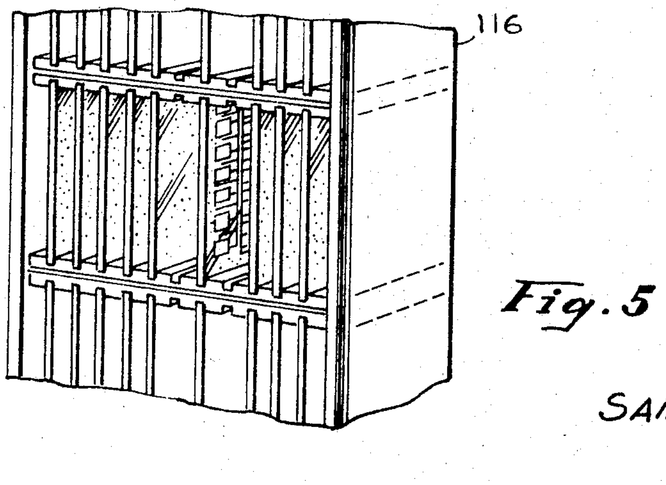
FIG. 5 is a perspective view illustrating several of the circuit boards of FIG. 4 mounted to form the structural package electrically shown in FIG. 2.

It should be appreciated that FIG. 3 specifically illustrates the various gates required to implement the transfers shown in FIG. 2. Thus, it should be appreciated that the logic circuitry 36, for example, shown in FIG. 2, is implemented in FIG. 3 by gates 82 and 88. Likewise, the logic circuitry 62 is implemented by gates 102, 104, and 106. Accordingly, it should now be appreciated that regardless of the specifics of the digital data equipment, the register stages, arithmetic unit stages, and logic circuit stages associated with each of the bits can be isolated as shown in FIG. 3. In accordance with the concept of the present invention, the circuitry associated with each of the bits is contained in a separate physical package. Thus, FIG. 4 illustrates a substantially conventionally constructed printed circuit board 108 carrying the componentry 110 required to implement the logical circuitry of FIG. 3. The componentry 110 can, for example, be in the form of discrete components, integrated circuit flat packs, etc. The circuit board 108 carries electrical interconnecting means 112 for interconnecting the componentry 110. A bank of conductive pads 114 is provided adjacent one edge of the board for facilitating interconnection with other boards. In order to fabricate an eight bit digital computer as shown in FIG. 2, eight of the printed circuit boards 108 can be mounted in a rack 116 as shown in FIG. 5. If a substantially similar digital computer of increased word length is desired, it is merely necessary to employ a greater number of physical bit packages or circuit boards.

Figure 6:
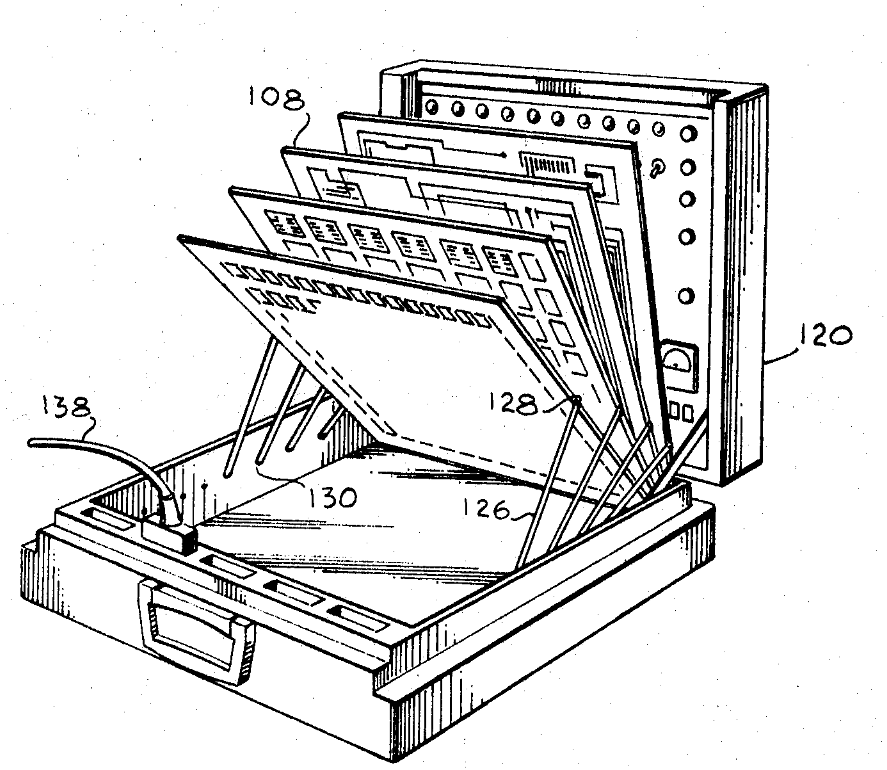
FIG. 6 is a perspective view illustrating another manner of mounting circuit boards to form the digital computer of FIG. 2.
Figure 7:
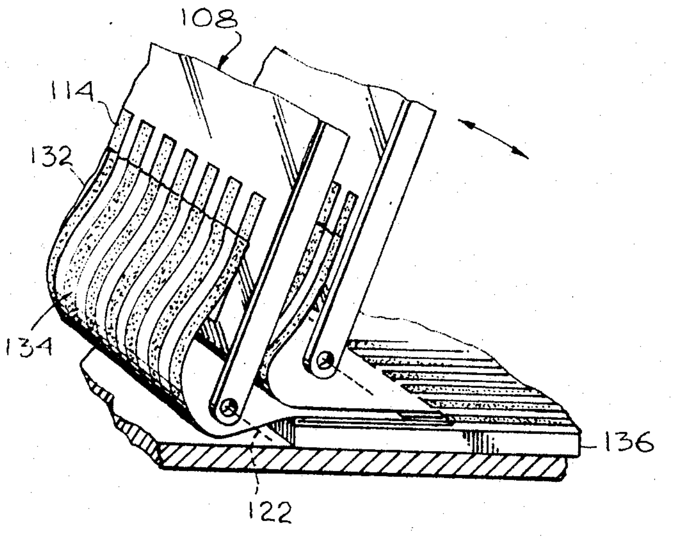
FIG. 7 is an exploded perspective view illustrating the circuit board mounting means employed in FIG. 6.

In lieu of mounting the boards 108 as illustrated in FIG. 5, an even denser yet more convenient mounting system as illustrated in FIG. 6 can be used. More particularly, a housing 120 is provided which for many systems can be sufficiently small so as to be portable. As shown in detail in FIG. 7, each of the packages or boards 108 is mounted for pivotable movement about a hinge axis 122. All of the hinge axes are preferably parallel and in the same plane. In this manner, the boards can be very densely packaged within the housing 120 when it is closed. However, when the housing 120 is open, the boards can be selectively pivoted about the hinge axes in order to provide access to both their surfaces. In order to enable the boards to be retained in a selected pivotal position, rods 126 are provided adapted to extend between apertures 128 and 130 in the boards and housing respectively. Means, of course, must be provided for electrically interconnecting the circuit board packages and for connecting the entire computer to the outside world (e.g., to a power supply). In order to interconnect the boards, a piece of flexible material 132, e.g., Mylar, upon which circuit conductors 134 can be deposited, is provided for each board. The conductors 134 are connected between the pads 114 on the circuit boards and conductors on another board 136. Connections to external devices such as a power supply can be made through a cable 138, for example, to the mother board.

From the foregoing, it should be appreciated that an improved packaging means has been disclosed herein which enables digital data equipment to be fabricated from fewer different physical packages, thus reducing costs and increasing reliability. It is recognized that in some instances, it may not be desirable to package all of the componentry associated with a particular bit in a single physical package. Thus, in the implementation of a particular piece of digital data equipment, certain compromises may be desirable. For example, in order to achieve greater speed, it may be desirable to package the adder circuitry, or at least portions thereof, in a separate physical package in order to minimize carry propagation times. If this is the case, the physical package for each bit may consist only of the register stages associated with that bit and the logic circuitry required for transfers with the arithmetic circuitry being contained in a separate package. In other situations, where the technology permits, it may be preferable to consider the bits in two's and three's. That is, it is recognized that it may be advantageous in certain applications to contain the circuitry associated with two or three bits in a single package.

It should also be appreciated that the invention is in no sense dependent upon any particular fabrication technology. Thus, although the bit package shown herein is illustrated as being physically implemented via discrete components mounted on a circuit board, the teachings of the invention are equally applicable to the utilization of integrated circuit packages, for example. Likewise, the invention can be practiced through the utilization of magnetic, fluid, cryogenic, or other types of systems. Accordingly, inasmuch as it is recognized that modifications and variations falling within the spirit of the invention will occur to those skilled in the art, it is not intended that the scope of the invention be determined by the disclosed exemplary embodiments, but rather should be determined by the breadth of the appended claims.

The embodiments of the invention in which an exclusive property or privilege is claimed are defined as follows:

1. A digital data apparatus including:

P groups of bit stages including at least one data storage register group comprised of a plurality of substantially identical bit storage stages and at least one logic apparatus group comprised of a plurality of substantially identical bit logic stages;

a plurality of packaging means each carrying one or more corresponding bit stages from each of said groups; and interconnecting means carried by each of said packaging means interconnecting the bit stages carried thereby.

2. The apparatus of claim 1 wherein each of said packaging means includes only one stage from each of said groups.

3. The apparatus of claim 1 wherein each of said packaging means comprises an integrated circuit.

4. The apparatus of claim 1 including means electrically interconnecting said plurality of packaging means.

5. The apparatus of claim 1 wherein at least one of said groups of stages is comprised of discrete electronic components and wherein each of said packaging means comprises a circuit board.

6. The apparatus of claim 5 including means mounting said circuit boards for pivotal movement about substantially parallel axes.

7. A digital data apparatus for processing digital words comprising N bit positions, said apparatus including P groups of N substantially identical bit logic stages, each group being adapted to perform a distinct logical function in respect of data input to and processed by said apparatus;

first packaging means carrying electronic components defining P x X bit stages arranged in X sets of P bit stages, each set being adapted to carry out said disttinct functions in respect of data represented at a different one of said N bit positions;

second packaging means carrying electronic components defining P x Y bit stages arranged in Y sets of P bit stages, each set being adapted to carry out said distinct functions in respect of data represented at a different one of said N bit positions, where $X+Y=N$;

electrical interconnecting means carried by each of said packaging means operatively interconnecting the P bit stages comprising each set carried thereby; and means electrically interconnecting said first and second packaging means for intercoupling related bit stages serving any given group to effect the performance of the distinct data processing function ascribed thereto.

8. Apparatus for implementing a digital data processing system functionally comprised of a plurality of N bit data registers and a plurality of N big logic circuits, said apparatus including:

a plurality of physical packages each carrying at least one corresponding bit stage from each of said data registers and logic circuits;

interconnecting means carried by each of said packages for interconnecting the stages carried thereby; and means electrically interconnecting said plurality of physical packages.

9. The apparatus of claim 8 wherein each of said packaging means comprises a circuit board; and means mounting said circuit boards for pivotal movement about substantially parallel axes.

References Cited

UNITED STATES PATENTS

| | | | |
|---|---|---|---|
| 3,147,402 | 9/1964 | Hochstetler | 317—100 |
| 3,147,404 | 9/1964 | Sinner | 317—101 |
| 3,191,099 | 6/1965 | Rezek | 317—101 |
| 3,302,182 | 1/1967 | Lynch et al. | 340—172.5 |
| 3,312,943 | 4/1967 | McKindles et al. | 340—172.5 |

ROBERT C. BAILEY, *Primary Examiner.*

PAUL R. WOODS, *Assistant Examiner.*

U.S. Cl. X.R.

340—172.5